April 16, 1957  J. E. WHITFIELD  2,788,799
PRESSURE RELIEF VALVE
Filed Sept. 22, 1953  2 Sheets-Sheet 1

INVENTOR.
Joseph E. Whitfield
BY
Otto Moeller
Attorney

April 16, 1957 J. E. WHITFIELD 2,788,799
PRESSURE RELIEF VALVE
Filed Sept. 22, 1953 2 Sheets-Sheet 2

INVENTOR.
Joseph E. Whitfield
BY
*Otto Moeller*
Attorney

United States Patent Office 2,788,799
Patented Apr. 16, 1957

2,788,799

PRESSURE RELIEF VALVE

Joseph E. Whitfield, York, Pa., assignor, by mesne assignments, to Capitol Products Corporation, Mechanicsburg, Pa., a corporation of Pennsylvania Application September 22, 1953, Serial No. 381,709

3 Claims. (Cl. 137—494)

This invention relates to improvements in valves and has particular reference to a pressure regulating type valve.

Pressure regulating valves usually consist of a valve and its seat, the valve being held against the seat by a spring, the tension of which spring is regulated by suitable means; or in some instances the valve is held against its seat by a weight, and opening of the valve at desired pressures is controlled by adding or subtracting weights. An object of the present invention is to provide a pressure regulating valve which may be simply adjusted to open at a desired pressure and in which such springs or weights with their concomitant disadvantages are dispensed with, as hereinafter described.

Another object is to provide a pressure regulating valve of the above type having a fluid cushioning chamber retarding closing of the valve and preventing chattering thereof due to undesirably rapid opening and closing.

A further object is to provide a pressure regulating valve of this type that is efficient and reliable in operation and that will admit of a large range of adjustment.

The above and other objects and features of the invention will appear more fully hereinafter from a consideration of the following description taken in connection with the accompanying drawings, wherein one embodiment of the invention is illustrated by way of example.

Figure 2:
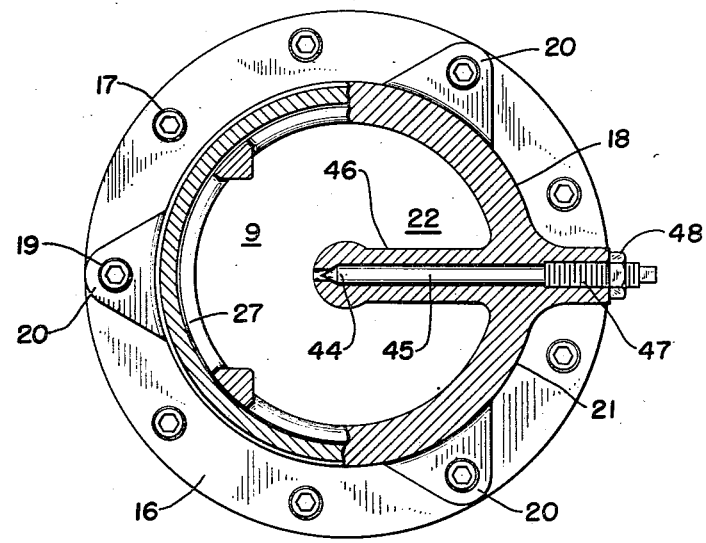
Figure 2 is a sectional view taken on the line 2—2 of Figure 1 looking downwardly in the direction of the arrows.

Referring to the drawings in detail, the novel regulating valve 10 is shown as applied to a pipe line or conduit 11 through which flows fluid under pressure, the regulating valve 10 being adapted to protect the pressure system against excessive pressures and to maintain a constant desired pressure in the system.

The pressure fluid pipe line 11 is provided with an upwardly opening pressure relief outlet pipe 12 having at its upper end and outwardly projecting annular flange 13 on which is supported in vertical position, the novel pressure regulating valve 10. In order to accommodate any one of a number of sizes of valves, a suitable adapter flange 14 is secured on the flange 13, as by bolts 15, and an annular adapter ring 16 is seated on and secured to the adapter flange 14, as by cap screws 17.

The cylindrical valve body 18 of the valve 10 is seated on the adapter ring 16 and is secured thereon in suitable manner, as by cap screws 19 extending through ears 20 formed with and projecting outwardly of the annular base 21 of the valve body 18, and also extending through the adapter ring 16 into the adapter flange 14. The annular base 21 defines a pressure fluid inlet 22 to the valve body 18.

Rising from the base 21, the valve body 18 includes a lower hollow cylindrical body portion 23 defining a chamber 9 for receiving pressure fluid through the inlet 22; and an upper cylindrical body portion 24, coaxial with and preferably having a smaller diameter than the lower body portion 23. An annular horizontal wall 25 joins the upper marginal edge of the cylindrical wall 26 of the lower body portion 23 and the lower marginal edge of the upper body portion 24; the wall 25 and the base of the upper body portion 24 forming a top wall for the chamber defined by the lower body portion 23.

The cylindrical wall 26 of the lower body portion 23 is provided with a plurality of ports 27 through which, when the pressure regulating valve is open, fluid under pressure will exhaust. The area of the ports 27 is preferably as great or greater than the area of the inlet 22, to permit rapid exhaust of a large volume of pressure fluid.

A cylindrical valve casing, designated as a whole by the reference character 28, telescopically embraces the valve body 18 and follows generally the contour thereof. The valve casing 28 includes a lower cylindrical portion or valve member 29 telescopically engaging the cylindrical wall 26 of the lower body portion 23 of valve body 18. The valve member 29 seats on the base 21 of the valve body 18, and when so seated effects a closure for the pressure exhaust or relief ports 27.

The valve casing 28 also includes an upper cylindrical wall portion 30 telescopically embracing the upper body portion 24 of valve body 18. An annular horizontal wall 31 joins the upper edge of valve member 29 and the lower edge of the upper cyclindrical wall portion 30 of valve casing 28. The inside or bottom surface of the annular horizontal wall 31 is provided with a marginal annular depending shoulder 32 arranged to seat on the marginal end portion of the annular horizontal wall 25 when the valve member 29 seats on the base 21 of the valve body 18. When so seated there is provided between the adjacent surfaces of horizontal walls 25 and 31 a relief space 33, communicating with atmosphere through apertures 34 in the wall 31, the purpose of which will be later described.

Any pressure fluid leaking from the ports 27 between the valve body 18 and the valve casing 28 past the seat 32 to the under side of the annular wall 31, escapes to atmosphere through the apertures 34. This precludes accumulation of pressure against the under side of the wall 31 and prevents such pressure leakage from exerting a lifting force tending to raise the valve member 29 from its seat.

At its upper end, the valve casing 28 is provided with a top wall 35 from which there extends a vertical sleeve 36 telescopically engaging a stem 37 projecting upwardly from the top of the upper valve body portion 24 of valve body 18. The stem 37 constitutes a guide for the valve casing 28 as it is moved upward and downward whereby the valve member 29 effects opening and closing of the exhaust ports 27. A stop member 50 on the stem 37 limits the vertically upward movement of the valve casing 28.

The bottom surface of the top wall 35 is arranged, when the valve casing 28 is seated, to provide with the top wall 38 a chamber 39. As hereinafter described, this inner surface of the top wall 35 forms a pressure responsive area or lifting face 40 for the valve casing 18. Since the effective lifting area 40 of the valve casing is small as compared to the area of the exhaust passage and ports, it is apparent that a large volume of pressure fluid can be exhausted while maintaining a comparatively small lifting area.

A boss 41 formed with and depending from the upper body portion 24 projects into the pressure chamber 9 and a restricted passage 42 in the boss 41 and upper valve body portion 24 provides communication between the chamber 9 and chamber 39. The upper end of the passage 42 is preferably formed of a plurality of divergent branching passages 43, the sum of the cross sectional areas of which is substantially equal to the cross sectional area of the lower portion of passage 42. The extent of the opening in the passage 42 is controlled by a valve member 44, the stem 45 of which projects laterally through the base 21 of the valve body 18 and is housed in a sleeve 46 formed with and joining the lower end of the boss 41 and the valve body base 21. The end of the stem 45 is threaded, as at 47, into and projecting from sleeve 46. By turning the valve stem 45 in one direction or the other, the extent of the opening in the passage is controlled by inward and outward movement thereof and may be locked in desired position by lock nut 48 threaded on the projecting end of the threaded portion of stem 45.

Between the adjacent surfaces of the cyclindrical wall 30 of the valve casing 28 and the wall of the upper valve body portion 24 there is provided a leakage clearance 49 forming a restricted outlet from the chamber 39 and providing communication from the chamber 39 to the relief space 33 and thence to atmosphere through the apertures 34.

It is common to employ a spring to hold a valve against its seat, and by adjusting the tension of the spring, to provide for opening of the valve at any desired pressure. In other cases, the valve is held against its seat by weights, and by a proper selection of such weights, to provide for opening of the valve at any desired pressure. Where springs are employed, the closing force applied to the valve throughout its movement is not constant, since in accordance with Hooke's law the force exerted is proportional to the amount of spring deflection. Also due to fatigue, the force exerted by a spring will gradually change. These objections are obviated in my novel relief valve by eliminating the use of springs in the construction. The use of weights means additional parts and makes the valve more cumbersome. In the present construction such weights are also eliminated.

The leakage clearance 49 which, as previously stated, is formed to provide a restricted outlet from the chamber 39, constitutes an important feature of the invention, since it permits by appropriate setting of the valve 44 to provide in chamber 39 a pressure equilibrium just sufficient to raise the valve casing 28 at any desired pressure in line 11. If there were no outlet restriction from the chamber 39, obviously no pressure would build up and the valve casing 28 would never be raised. At the other extreme, if the restriction were such that leakage from chamber 39 would be negligible, then irrespective of the setting of valve 44, a pressure equilibrium just sufficient to raise the valve casing 28 could not be maintained for different pressures in line 11, and to provide for raising of the valve casing 28 at different pressures, the use of springs or weights is necessary as previously explained.

For purpose of illustration, let it be assumed that a pressure of three pounds is necessary in chamber 39 to raise the valve casing 28, and that it is desired to open the valve at fifty pounds' pressure in line 11. Valve 44 is adjusted so that the cross sectional area of the effective passage 42 is so related with respect to the cross sectional area of the restricted outlet from chamber 39 as determined by the leakage clearance 49, that a pressure equilibrium of three pounds is provided in chamber 39. If it is now desired to have the valve open at, for example, twenty pounds' pressure in line 11, a new relation between the effective passage 42 and leakage clearance 49 must be established to provide for a pressure equilibrium of three pounds in chamber 39 in order to raise the valve casing 28, since the velocity of flow through passage 42 is less at twenty pounds' pressure in line 11 than at fifty pounds as in the first illustration. Therefore, in order to obtain the same flow, the valve 44 is adjusted to increase the effective area of passage 42. Thus, for any desired opening pressure of the valve, it is only necessary to adjust the valve 44.

In order to make the valve effective over a wide range of pressures, it is important that the relation of the passage 42 and leakage clearance 49 be such that by adjustment of valve 44, the effective passage 42 can be made smaller or larger than the leakage clearance 49.

In the last illustration, for example, since the pressure differential between the twenty pounds in line 11 and the pressure of three pounds in the chamber 39 is greater than the differential between the three pounds in chamber 39 and atmosphere, it is obvious that the velocity of flow through passage 42 is considerably greater than through leakage clearance 49. It is necessary, therefore, to adjust valve 44 to provide an effective passage 42 smaller than leakage clearance 49, so that the flow therethrough will equal the flow through leakage clearance 49 at a pressure differential of three pounds to atmosphere.

On the other hand, if it is desired to have the valve open at four pounds' pressure in line 11, it will be seen that the pressure differential between four pounds in line 11 and three pounds in chamber 39, is less than the differential between the three pounds in chamber 39 and atmosphere. Therefore, to provide a pressure equilibrium of three pounds in chamber 39, the valve 44 must be adjusted to provide an effective passage 42 greater than leakage clearance 49 in order to compensate for the greater velocity through leakage clearance 49.

In the above illustrations, frictional resistance to flow has not been considered, it being understood that such frictional resistance to flow will to an extent modify the adjustment of valve 44 to provide the proper flow through passage 42 and leakage clearance 49 to obtain the desired pressure equilibrium in chamber 39 to raise the valve.

It is, of course, appreciated that the valve will not function at pressures in line 11 below the pressure necessary to overcome the weight of the valve casing 28, unless the downward force of the weight of the valve is counterbalanced by spring or other means effecting an equivalent upward force against the valve casing 28.

Figure 3:
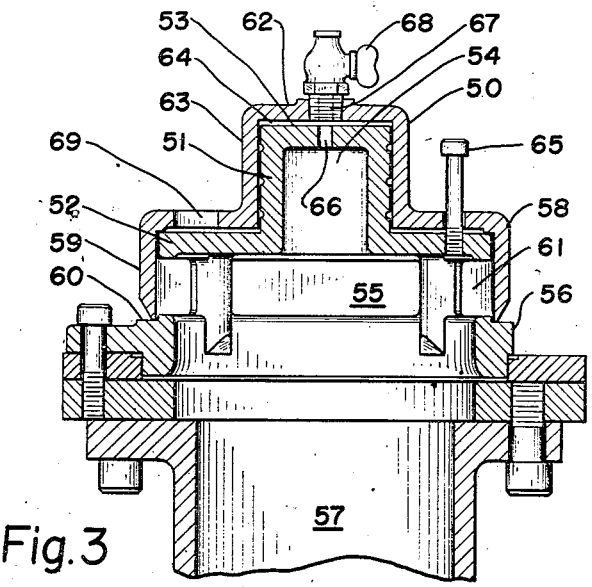
Figure 3 is a view similar to Figure 1 illustrating a modified form of the invention.

In Figure 3 is shown a modified form of the invention in which the cross sectional area of the passage corresponding to the passage 42 of the first form of the invention is fixed while the cross sectional area of the restricted outlet corresponding to the leakage clearance 49 of the first form of the invention is adjustable.

Figure 1:
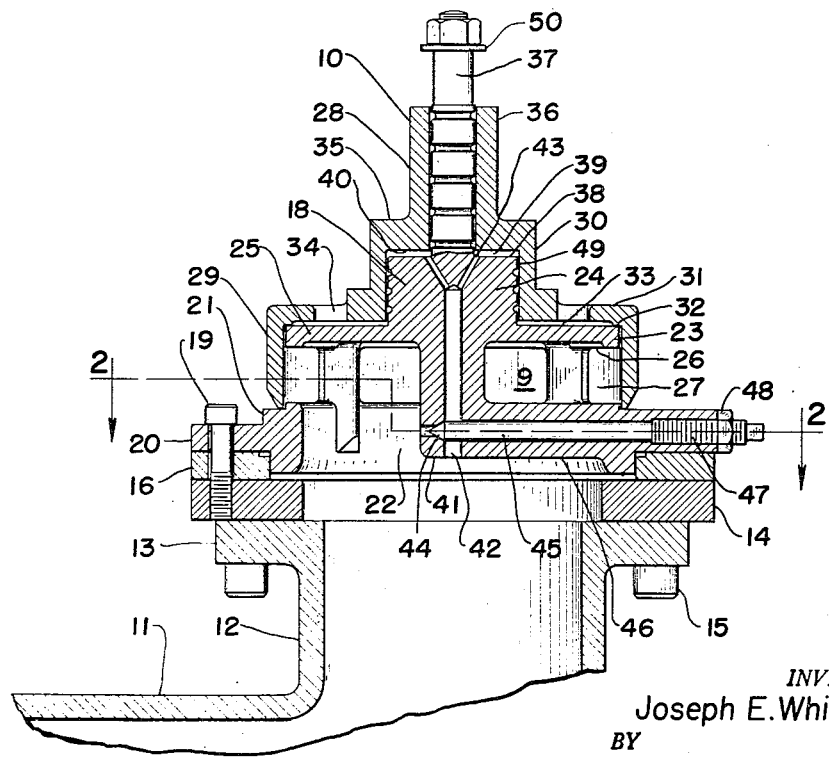
Figure 1 is a view in vertical central cross section of the novel valve, shown in closed position.

It is apparent that for the most part the construction of the pressure regulating valve 50 of Figure 2 is similar to that of the valve 10 of Figure 1, so that a detailed description of valve 50 is not necessary. In valve 50, the upper cylindrical body portion 51 of valve body 52 together with its top wall 53 defines a chamber 54 which is open at its lower end to the chamber 55 in the lower cylindrical body portion 56 of valve body 52. Thus, pressure fluid enters chambers 54 and 55 through pipe 57 which is connected to a pressure system to be controlled, as previously described in connection with Figures 1 and 2.

The cylindrical valve casing 58 telescopically embraces the valve body 52 and includes a lower cylindrical portion or valve member 59 which seats on the base 60 of the valve body 52, and when so seated effects a closure for the pressure exhaust or relief ports 61 in the lower body portion 56 of valve body 52.

When the valve casing 58 is seated, the top wall 62 of its upper cylindrical portion 63 provides with the top wall 53 a chamber 64 corresponding to chamber 39 of the first form of the invention, and the inner surface of top wall 62 constitutes the lifting face of the valve casing 58. One or more stop members 65 limit the upward travel of the valve casing 58.

A passage 66 in the top wall 53 of the valve body portion 63 provides communication between the chamber 54 and the chamber 64 whereby pressure fluid enters chamber 64 to raise the valve casing 58 to expose the relief ports 61 for exhaust of pressure fluid from the system to be regulated to atmosphere.

In order to regulate the opening of the valve at a predetermined pressure in the system to be controlled, a restricted passage 67 from the chamber 64 to atmosphere is provided in the top wall 62 of the upper valve casing portion 63. The extent of the restricted passage is manually controlled by a valve 68. As in the first form of the invention the relation of the passage 67 in addition to the leakage from chamber 64 through the working clearance between the adjacent cylindrical wall portions of the upper valve body portion 51 and the upper valve casing portion 63, to atmosphere through the apertures 69, with respect to the passage 66 is such that by adjustment of valve 68, the effective passage from the chamber 64 to atmosphere can be made smaller or larger than the passage 66.

The same results are obtained by adjustment of valve 68 of the modified form of the invention as by adjustment of the valve 44 of the first form of the invention and the mode of operation is the same.

Figure 4:
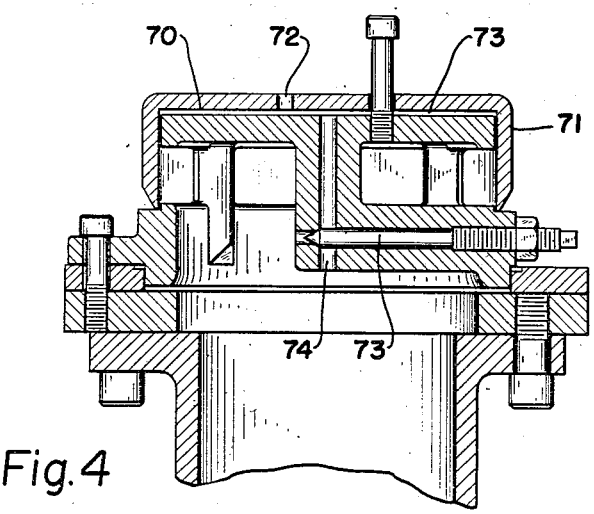
Figure 4 is a view similar to Figure 1 illustrating still another modified form of the invention.

The modification shown in Figure 4 is generally similar to the form of the invention shown in Figures 1 and 2, except that in order to reduce the height of the valve, the reduced upper portions of the valve body and valve casing have been dispensed with so that the lifting face 70 of the valve casing 71 is proportionately larger than the lifting face 40. In the modified form of the invention, the restricted outlet 72 from the chamber 73 corresponds to the leakage clearance 49 from the chamber 39 of the first form of the invention. As in the first form of the invention, an adjustable valve 75 is manually adjusted to provide the proper relation between the passage 74 to the chamber 73 and the passage 72 from the chamber 73, all as described in detail in the description of the first form of the invention.

I claim:

1. A pressure relief valve comprising, an axially upright cylindrical valve body having a top wall and an open bottom defining in said valve body a chamber adapted for communication through said open bottom with a pressure fluid system, a pressure exhaust port in the cylindrical side wall of said valve body for exhausting pressure fluid from said chamber, a cylindrical valve casing having a top and cylindrical side wall embracing respectively the top and cylindrical side wall of said valve body, the cylindrical side wall of said valve casing normally forming a closure for said pressure exhaust port, a second chamber between the top walls of said valve body and valve casing, a restricted passage in the top wall of said valve body providing communication between said first and second chamber for flow of pressure fluid from said first chamber to said second chamber to raise said valve casing and uncover said pressure exhaust port, a restricted passage from said second chamber to atmosphere, and valve means for adjusting the extent of restriction of one of said passages to build up in said second chamber a pressure just sufficient to overcome the weight of said valve casing at a predetermined desired higher pressure in said first chamber whereby to raise said valve casing to uncover said pressure exhaust port.

2. A pressure relief valve according to claim 1, wherein the cross sectional area of the passage between said first and second chambers is greater than the cross sectional area of the passage between said second chamber and atmosphere and wherein said valve means is disposed in said last named passage for selectively making said last named passage greater or smaller than said first named passage.

3. A pressure relief valve comprising, an axially upright cylindrical valve body having a lower cylindrical portion and an upper cylindrical portion coaxial with and of reduced diameter with respect to said lower body portion, said lower body portion defining a chamber and having a bottom inlet for communication with a pressure fluid system and having a pressure exhaust port in its cylindrical side wall, an axially upright cylindrical valve casing embracing the top and cylindrical side wall of said valve body and comprising a lower cylindrical portion normally forming a closure for said pressure exhaust port and also comprising an upper cylindrical portion coaxial with and of reduced diameter with respect to said lower valve casing portion in surrounding spaced relation with respect to said upper valve body portion to provide a clearance therebetween, a second chamber between the respective top walls of said upper valve body portion and upper valve casing portion, said clearance forming a restricted passage for pressure fluid from said second chamber to atmosphere, a passage in said upper valve body portion providing communication between said first and second chambers for flow of pressure fluid from said first chamber to said second chamber to raise said valve casing and uncover said pressure exhaust port, and valve means associated with said last named passage for adjusting the restriction thereof to build up in said second chamber a pressure just sufficient to overcome the weight of said valve casing at a predetermined desired higher pressure in said first chamber whereby to raise said valve casing to uncover said pressure exhaust port.

References Cited in the file of this patent

UNITED STATES PATENTS

| 318,961 | Crosby | June 2, 1885 |
| 1,874,793 | Nightingale | Aug. 30, 1932 |
| 2,087,037 | McCarthy | July 13, 1937 |